United States Patent
Vial et al.

(10) Patent No.: US 8,787,612 B2
(45) Date of Patent: Jul. 22, 2014

(54) METHOD AND AN APPARATUS FOR MARKING IMAGE SEQUENCES, A SUPPORT COMPRISING SUCH MARKS, AND A METHOD AND AN APPARATUS FOR IDENTIFYING SUCH MARKS

(75) Inventors: Jean-François Vial, Rennes (FR); Olivier Courtay, Rennes (FR)

(73) Assignee: Thomson Licensing, Boulogne, Billancourt (FR)

( * ) Notice: Subject to any disclaimer, the term of this patent is extended or adjusted under 35 U.S.C. 154(b) by 740 days.

(21) Appl. No.: 12/319,263

(22) Filed: Jan. 5, 2009

(65) Prior Publication Data
US 2009/0175494 A1 Jul. 9, 2009

(30) Foreign Application Priority Data
Jan. 9, 2008 (EP) ..................... 08300013

(51) Int. Cl.
*G06K 9/00* (2006.01)
*H04N 1/32* (2006.01)

(52) U.S. Cl.
CPC ................. *H04N 1/32288* (2013.01)
USPC ........................................ 382/100

(58) Field of Classification Search
CPC ................................. H04N 1/32245
USPC ............. 380/51, 54, 210, 287, 251; 358/3.28; 382/100, 232; 713/176
See application file for complete search history.

(56) References Cited

U.S. PATENT DOCUMENTS

| | | | |
|---|---|---|---|
| 6,882,356 B2 | 4/2005 | Roddy et al. | |
| 2003/0021439 A1 | 1/2003 | Lubin et al. | |
| 2004/0109016 A1* | 6/2004 | Antonellis et al. | 345/716 |
| 2005/0066237 A1* | 3/2005 | Greenwald et al. | 714/42 |
| 2005/0154892 A1* | 7/2005 | Mihcak et al. | 713/176 |
| 2006/0286489 A1 | 12/2006 | Duffield et al. | |

FOREIGN PATENT DOCUMENTS

| | | | | |
|---|---|---|---|---|
| GB | 2325765 | | 12/1998 | |
| GB | 2407227 | | 4/2005 | |
| JP | 11041571 | | 2/1999 | |
| JP | 2003179892 | | 6/2003 | |
| JP | 2006517357 | | 7/2006 | |
| WO | WO2004030339 | | 4/2004 | |
| WO | WO2005114570 | | 12/2005 | |
| WO | WO 2007/149086 | * | 12/2007 | ............ G06T 1/00 |
| WO | WO2007/149086 | | 12/2007 | |
| WO | WO2007149070 | | 12/2007 | |

OTHER PUBLICATIONS

Search report dated Jul. 4, 2008.

* cited by examiner

*Primary Examiner* — Amara Abdi
(74) *Attorney, Agent, or Firm* — Jeffrey D. Carter

(57) ABSTRACT

A method for marking a series of images such as a film for identification. A copy of the film is associated with a series of pseudorandom values that correspond to fields of a virtual grid covering an image. A visible mark is put into the field corresponding to the first pseudo-random value in M consecutive images followed by a number N of unmarked images (N 0) before repeating this using the next pseudo-random value. The visible marks are advantageously quite small so as to keep user disturbance to a minimum, but they may also be quite visible. Also provided is a marking apparatus.

9 Claims, 3 Drawing Sheets

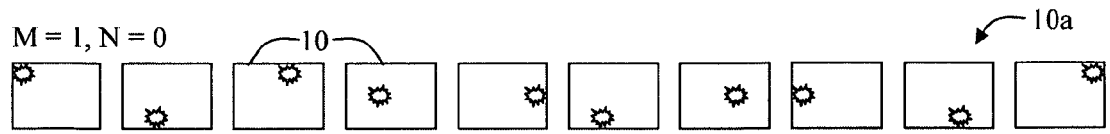
Figure 1a
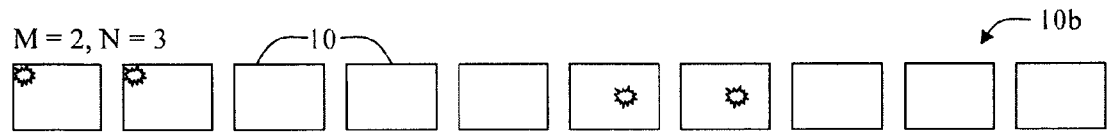
Figure 1b
| 1 | 2 | 3 | 4 |
|---|---|---|---|
| 5 | 6 | 7 | 8 |
| 9 | 10 | 11 | 12 |
Figure 2
Figure 3
| 1 | 2 | 3 | 4 |
|---|---|---|---|
| 5 | 6 | 7 | 8 |
| 9 | 10 | 11 | 12 |
| 1 | 2 | 3 | 4 |
|---|---|---|---|
| 5 | 6 | 7 | 8 |
| 9 | 10 | 11 | 12 |
| 1 | 2 | 3 | 4 |
|---|---|---|---|
| 5 | 6 | 7 | 8 |
| 9 | 10 | 11 | 12 |
Figure 4

METHOD AND AN APPARATUS FOR MARKING IMAGE SEQUENCES, A SUPPORT COMPRISING SUCH MARKS, AND A METHOD AND AN APPARATUS FOR IDENTIFYING SUCH MARKS

This application claims the benefit, under 35 U.S.C. §119 of EP Patent Application 08300013.3, filed Jan. 9, 2008.

FIELD OF THE INVENTION

The present invention relates generally to video processing, and in particular marking of video.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Illegal copies of video content such as films may be produced in several ways.

A first example relevant to this invention is the making of copies in the movie theatre, usually with the aid of a smuggled video camera during a public screening of the film, but sometimes with the aid of the projectionist. Such copies are often spread over the Internet or on DVDs or other supports within days of the premier of the film, thereby causing important loss of revenue to the cinematographic industry, both for sales of cinema tickets and sales of DVDs.

In order to combat such copies, the prior art proposes the use of a so-called "Coded Anti-Piracy Code" (CAP Code) that burns each reel of film or batch of reels with a unique, visible mark that identifies the particular copy and, indirectly, the cinema theatre in which the film was screened. A drawback of the CAP Code system is that the marks are clearly visible to the audience and that they for this reason are introduced in a limited number of frames only so as to try and limit the disturbance. The result is that spectators sometimes complain nonetheless, while the pirates relatively easily may remove the code by suppressing a few frames.

A second example relevant to this invention, is the making of copies from a limited distribution DVD, such as a "screener DVD" distributed to film critics and jury members of film competitions such as the "Academy Awards®". In this case, it is possible that the film has not even had its premier yet, and even graver loss of revenue and prestige may result.

A solution is, in this example as well, the insertion of a unique mark that identifies the person or the institution to which the DVD has been sent. A difference is that these marks may be clearly visible and that they may remind the viewer that no copy should be made and that the viewer can be identified if a copy is made nevertheless. A disadvantage is that these quite visible marks may have a negative impact of the viewer's appreciation of the film. Naturally, if such marks are inserted before the film starts, then they may very easily be removed by a pirate.

It can therefore be appreciated that there is a need for a solution that allows robust marking of video content so that the content may be uniquely identified, while the visual disturbance to the viewer is minimized or, if viewer disturbance is not a major concern, an alternative solution to the marking problem. This invention provides such a solution.

SUMMARY OF THE INVENTION

In a first aspect, the invention is directed to a method of marking a copy of a series of images of the same size. First, a grid of P separate numbered virtual fields is defined so that the grid covers at least part of each image of the series. Then, a random or pseudo-random value is obtained and M consecutive images in the series of images are marked with a visible mark in the virtual field with the same number as the random or pseudo-random value. The obtaining and marking steps are reiterated at least once.

In a first preferred embodiment, following the M marked images, N consecutive are not marked, N being larger than or equal to zero. This step is repeated after each iteration of the obtaining and marking steps.

In a second preferred embodiment, N is a random or pseudo-random value obtained for each iteration.

In a third preferred embodiment, the grid covers the entire image.

In a fourth preferred embodiment, M is a random or pseudo-random value obtained for each iteration.

In a fifth preferred embodiment, the mark is put in a predetermined place of a field.

In a sixth preferred embodiment, the mark is put in a randomly chosen place of a field.

In a seventh preferred embodiment, the field of an image to mark is analyzed so that the mark may be put in the least visible place.

In an eighth preferred embodiment, the pseudo-random values are generated by an algorithm using at least an identifier of the copy as a seed.

In a ninth preferred embodiment, the random values are associated with an identifier of the copy.

In a second aspect, the invention is directed to a device for marking a copy of a series of images of the same size. The device comprises means for defining a grid of P separate numbered virtual fields so that the grid covers at least part of an image of the series; means for obtaining a random or pseudo-random value; and means for marking M consecutive images in the series of images with a visible mark in the virtual field with the same number as the random or pseudo-random value.

In a third aspect, the invention is directed to a support comprising a series of images of the same size marked using the method as claimed in claim 1, comprising a plurality of blocks of images that comprise M consecutive images with a visible mark in one of a plurality of P separate virtual fields followed by N unmarked images, wherein N may be zero.

In a first preferred embodiment, the support is a film reel.

In a fourth aspect, the invention is directed to a method of identifying a marked series of images. A plurality of images are searched for marks and, for each mark found, the image and a field in which it was found are noted, the field corresponding to a value. Then all possible combinations of values with a single value given for each image are generated and compared to a plurality of series of values to find at least one match. If more than one match is found, marks are searched for in further images and repeating the comparing step until a single match is found.

In a fifth aspect, the invention is directed to a device for identifying a marked series of images. The device comprises means for searching a plurality of images for marks and, for each mark found, noting the image and a field in which it was found, the field corresponding to a value; means for generating all possible combinations of values with a single value given for each image; and means for comparing the possible combinations to a plurality of series of values to find at least one match. The searching means is further adapted to search for marks in further images and the comparing means is further adapted to repeat the comparison using the values from the further images until a single match is found, if more than one match is found by the first comparison.

BRIEF DESCRIPTION OF THE DRAWINGS

Preferred features of the present invention will now be described, by way of non-limiting example, with reference to the accompanying drawings, in which:

FIG. 1 (comprising FIGS. 1a and 1b) illustrates sequences of marks in two series of images;

FIG. 2 illustrates a virtual grid of P cases;

FIG. 3 illustrates an example of a marked sequence;

FIG. 4 illustrates three exemplary positions of a mark in a field of an image;

PREFERRED EMBODIMENT OF THE INVENTION

Figure 5:
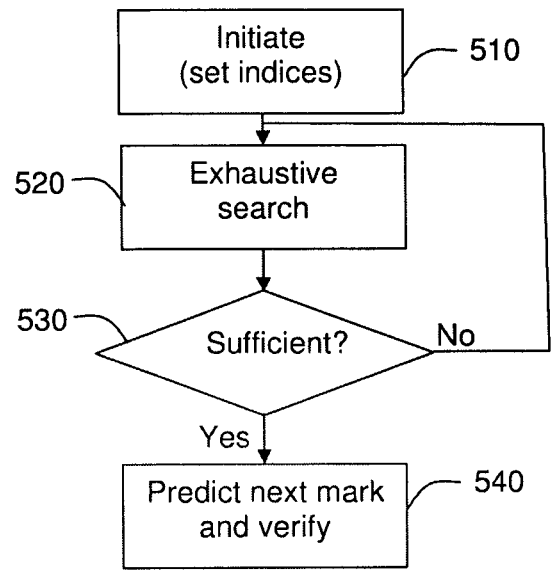
FIG. 5 illustrates a preferred embodiment of a detection method according to the invention.

The invention of inserting visible marks into a sequence of images (i.e. a video) is based on the following principles:

The marks are introduced into a goodly part, preferably the entirety, of the video.

According to the application, the marks may be hardly noticeable (e.g. a small patch of shadow) or, if it is desired that the marks should be evident, clearly visible (e.g. a white square of 8×8 pixels in a TV image).

There is preferably a single mark in each image.

The mark may change position for each new marked image, but it is also possible for it to remain in the same position for M images before changing position.

The mark may be present in each image, but it is also possible to leave N consecutive unmarked images between each marked image or series of M images.

The temporal sequence of the positions of the marks is preferably generated by a pseudo-random generator having the data to be coded (e.g. the reel number or a name) as seed. It is however also possible to use a random number as seed and then link this random number with the data to be coded. The skilled person will appreciate that ideally a true random value generator is used and the resulting sequence is associated with the data to be coded.

FIGS. 1a and 1b (that may be commonly denoted as FIG. 1) illustrate two sequences of marks in a series 10a, 10b of images 11. In FIG. 1a, M=1 and N=0, i.e. the mark changes position for every new mark (M=1) and each frame is marked (N=0). In FIG. 1b, M=2 and N=3, i.e. the same mark is used in two consecutive images (M=2) with three unmarked images (N=3) until the next two marked images. It should be noted that in FIG. 1 and in other applicable Figures, time runs from left to right and the marks are made unusually large for illustrative purposes.

The values M and N allow the adjustment of the compromise between robustness and image quality. For example, with M>1, the robustness is increased with regard to copies of film (24 images per second) made using a video camera (25 or 30 images per second), as it is ensured that all the marks are present in the copy, but as a trade-off the marks are more visible and the quantity of information carried by the marks is reduced. On the other hand, with N>0, the number of marks are reduced, leading to improved image quality but a lower quantity of conveyed information. It should be noted that N should preferably not be too large so as to risk collisions between different marked video; the number of marks should preferably be largely superior to the number of bits to code in the marks.

The marks are advantageously distributed in a virtual grid of P cases. FIG. 2 illustrates such a grid with P=12. The skilled person will appreciate that it is not necessary for the grid to cover the entire image to mark, that the grid is not necessarily linear, and that the fields are not necessarily of the same size. It is for example quite possible for the fields to be smaller towards the edges of the images, so as to increase the chances of a mark appearing relatively far from the image centre. The marking apparatus may define the grid and the fields by generating them, but it also possible for it to do so by retrieving a grid and fields generated by another device. The pseudo-random generator is then arranged to generate values between 1 and P inclusive, and mark is inserted into the field of the corresponding number. FIG. 3 illustrates an example of a marked sequence with M=1, N=1 and values 6, 4, 11, 2, 5 . . .

As already mentioned, the marks are preferably smaller than the field and they are not necessarily inserted in the centre of the field, as is illustrated in FIG. 4 for three exemplary positions of a mark in field number 6. As will be described further hereinafter, for the detection of a mark, it suffices to verify if a mark is present in a field or not, which can permit robust detection even if the images of the copy have been deformed. The skilled person will appreciate that it is possible to choose the location of insertion in a field so as to render the mark as little disturbing to a viewer as possible.

When it comes to detection of the marks and determination of the coded information, it is preferable to start with a recalculation of M and N if the image frequency of the copy is different from that of the original, which may be the case of a projected film (24 images per second) captured by a video camera (25 or 30 images per second). In the following description, it is assumed that M=1 and N=0 for reasons of clarity. The skilled person will however appreciate that if N>0, then the images in which no mark is expected may be ignored, and that several options are available for M>1, such as for example averaging the images in which the mark should be in the same position.

FIG. 5 illustrates a preferred embodiment of a detection method according to the invention using the steps hereinafter. For reasons of clarity, only some of the steps are illustrated in the Figure.

1. The images are treated one after the other. At first an image index i is set equal to a mark position index j which is set to the index of the first marked image. If a confidence value c is used, it is initialized to zero. Step 510.

2. An exhaustive search for marks in the image is performed, step 520. (It should be noted that pirates may attempt to thwart the marking by adding further marks.) This will be described in further detail hereinafter. If a sufficient number of marks have been found (step 530), the method moves on to step 3; otherwise step 2 is performed again.

3. Once a sufficient match between detected marks and possible coded data has been found, it is possible to predict the position X(j) of the mark (i.e. the field in which the mark should be located according to the pseudo-random sequence) in the present image I(i). A search is performed to detect the mark in the expected field. If the mark is found, then the next image I(i+1) is searched for a mark in the next expected position X(j+1) and the confidence value, if used, is increased by one. In other words, step 3 is iterated as long as a mark is found in the expected field. Step 540.

4. If a mark is not found in the expected position, this may be owing to a number of different reasons:
   a. One or more images have been deleted. This may in some cases be detected by a comparison of the present image I(i) and the corresponding image of an original (that does not necessarily correspond to the version that was used for the copy). In this event, the present image I(i) may be searched for marks that correspond to values further down the pseudo-random sequence X(j+1), but it is also possible to scan the entire image to find marks and then try to match the value against the pseudo-random sequence.
   b. The mark may have been erased. In this event, the method passes to the next image I(i+1) and the next expected position X(j+1).
   c. One or more images may have been inserted, e.g. by repetition. In this event, the method passes to the next image I(i+1) and searches for the mark in the same expected position X(j).

The method thus tries several combinations until it finds the increments i+i' and j+j' that allows the resynchronization of the images and the pseudo-random sequence. A number of well-known prior art techniques are available, depending on the available processing power and other constraints. In the description hereinafter, it will be assumed that it is not possible to go backward in the image sequence. At first the position is memorized (J=j)

5. Then the method searches for the next position X(j+1) and searches in image I(i) for the mark. If the mark is found, then the method continues with step 3. If not, then step 5 is reiterated a number of times depending on processing power before moving on to step 6.

6. The position is reinitialized (k=J), the next image is used and step 5 is iterated a number of times depending on processing power. If the confidence value c is used, then it may be decreased by one for each iteration until it reaches zero before moving to step 7.

7. At this point, it should be concluded that the coded data is not correct, i.e. the sequence of marks in the images does not correspond to the expected pseudo-random sequence. In this case, the method moves to step 2, exhaustive search.

The exhaustive search method mentioned hereinbefore will now be described in further detail, using a preferred exemplary embodiment. The exhaustive search is used when the marked sequence is not at all, or not sufficiently, known.

1. The image index i is estimated, based on scenes or other visual characteristics of the image sequence. This is particularly important if part of the image sequence is missing, such as if the start of the copy does not coincide with the start of the original. The search is thus performed for a certain range of probable indices.

2. The image is searched for marks in all possible fields (note that the fields do not necessarily cover the entire image), noting all marks, as it is possible that a pirate has inserted one or more marks and that real, original features of the images may be mistaken for marks.

3. Step 2 is repeated for a number of consecutive images, for example 10, so as to extract one or more fragments of the coded sequence. A single mark corresponds to 1/P of the total number of possible series, even if the mark is correctly interpreted. If one or more images comprise more than one mark, then all possible combinations should be examined. For example, if the first image comprises marks in positions 5 and 11, the second image comprises a mark in position 2 and the third image comprises marks in positions 4 and 7, then the series fragments to analyze are [5,2,4], [5,2,7], [11,2,4] and [11,2,7].

4. All the possible series are then searched for a match with the found fragment or fragments. If a single match is made, the method may continue with step 3 of the detection method hereinbefore.

5. If no match is found, either the method searches for image indices further and further away, or the searched part of the image sequence is declared unusable and the search is restarted further down the image sequence. If more than one match is found, the next mark or marks should be found until the found fragment corresponds to a single possible pseudo-random sequence.

In a variant, it is possible to vary the periodicity of the apparition of the marks, i.e. of the value of M and N, according to a further random or pseudo-random sequence or the like. In a further variant, that may combined with the first variant, the characteristics of the marks, such as shape or colour, are varied according to a further random or pseudo-random sequence or the like. The marks resulting from either variant are thus less easy to detect for a pirate, but it is possible that the marking is more sensitive to attacks as it is more difficult to synchronize the two sequences.

If a pirate manages to procure two marked originals and make copies there from, he may attempt a collusion attack. This is for example done by detecting the mark in an image, e.g. by a simple comparison, and then either insert the image from the other copy (if this is unmarked) or copy an unmarked part of the other image. As there is one chance in P that the mark is in the same field in both original versions, the pirate may remove up to 1-1/P of the marks, i.e. 92% of the marks with P=12.

A possible solution is to limit the number of fields, e.g. set P=4, and always insert the mark in the same position in the field. With two copies available to the pirate, it is not possible to erase more than 75% of the marks using this substitution technique. Thus, if the detection algorithm is sufficiently robust and the number of images is sufficiently big, then it is possible to identify the two originals.

Instead of erasing the marks, as described hereinbefore, the pirate may also randomly select from which original each image should be copied. In this event, the marks are visible, but the coded data is difficult to find without the aid of a big exhaustive search of all the images and statistical calculations of the found marks. First all the marks in all the images are found. Then, comparing each found mark with all the possible pseudo-random sequences and increase a probability counter of a pseudo-random sequence for each match. Finally, searching for pseudo-random sequences having probability counters significantly higher than other sequences.

Figure 6:
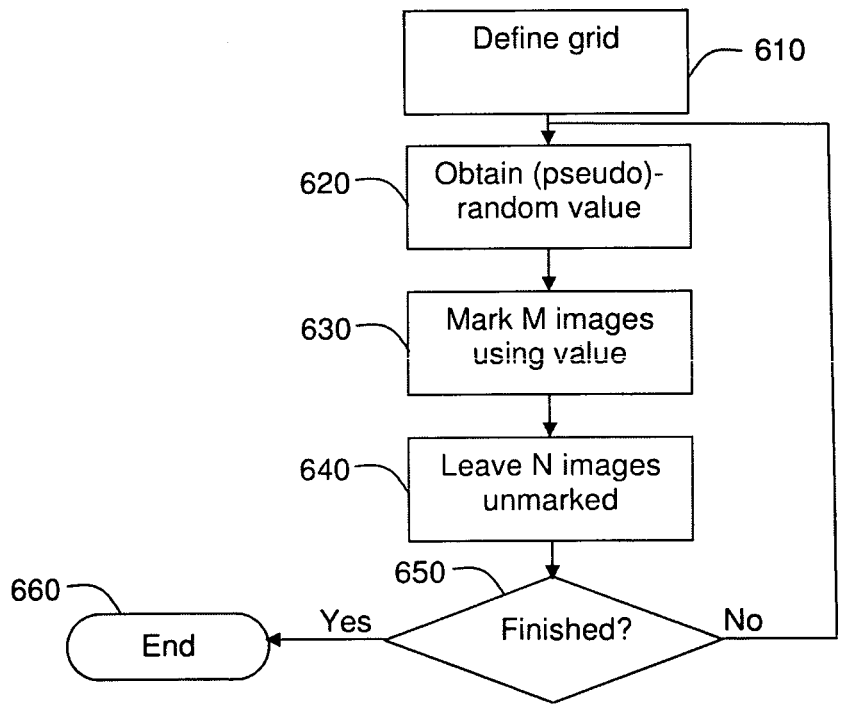
FIG. 6 illustrates a preferred embodiment of a marking method according to the invention.

FIG. 6 illustrates a summary of the preferred embodiment of the marking method described hereinbefore. A grid of P fields covering at least part of the image is defined in step 610, each field corresponding to a value between 1 and P. A random or pseudo-random value is obtained in step 620 and is used to mark M consecutive images in the corresponding field; step 630. N following images are then left unmarked in step 640; N≥0. In step 650 it is determined if enough images have been marked. If this is the case, the method ends in step 660; if not, the method continues with step 620.

Figure 7:
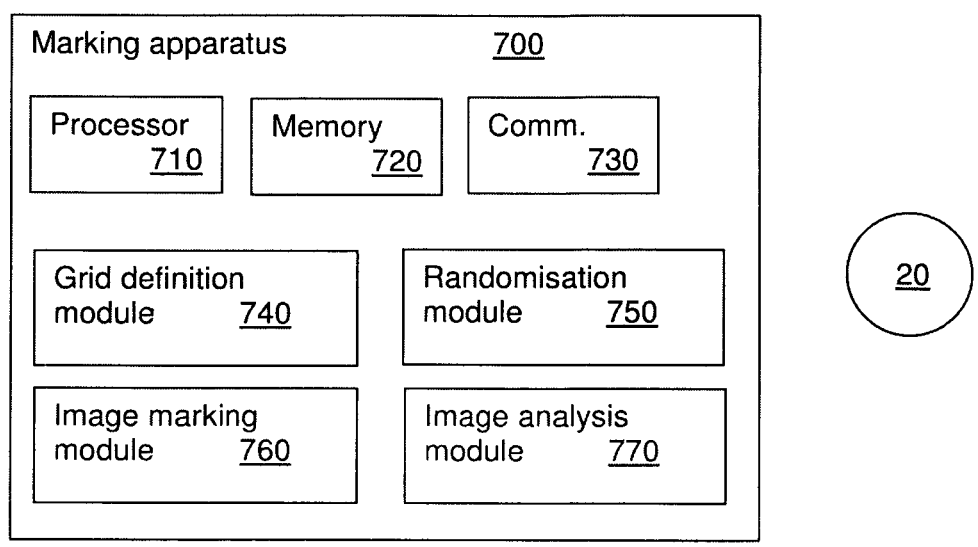
FIG. 7 illustrates an exemplary apparatus for marking a series of images according to any of the embodiments of the method of the invention described herein.

FIG. 7 illustrates an apparatus 700 for marking a series of images according to any of the embodiments of the method of the invention described herein. The apparatus 700 comprises a number of functional modules that each may be implemented in software, in a number of hardware components, or a combination thereof: a grid definition module 740 adapted to define grids and fields, a randomization module 750 adapted to generated or retrieve pseudo-random or random values, a marking module 760 adapted to insert marks into images, and an analysis module 770 adapted to analyze images so as to find the place where a mark is the least visible. The apparatus 700 comprises one or more processors ("processor") 710 that may implement the different modules, control the apparatus and perform steps of the method not implemented in these modules; one or more memory components ("memory") 720; and at least one communication interface 730. The apparatus 700 may thus mark copies 20 of series of images, stored on e.g. a reel of film, a DVD or any other suitable support.

The skilled person will appreciate that advantages of the invention can include:
- Low disturbance to the user; small marks that move often will be seen as noise.
- Robustness against deletion of marks, as a pirate has to search for marks to erase in many different images in unpredictable places.
- Robustness against insertion of marks.
- Limited risk of collision owing to the size of the inserted information.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of marking a copy of a series of images of a same size, wherein the copy is marked with a code that uniquely identifies the copy, the method performed via a device and comprising steps of:
   a) defining a grid of P separate numbered virtual fields so that the grid covers at least part of each image of the series;
   b) obtaining a random or pseudo-random value between 1 and P inclusive;
   c) marking M consecutive images in the series of images by placing a visible mark in the virtual field with a number corresponding to the random or pseudo-random value, and skipping N consecutive images in the series of images immediately following the M consecutive marked images; and
   iterating steps b) to c) at least once;
   wherein values of M and N vary according to a random, pseudo-random or other sequence.

2. The method as claimed in claim 1, wherein N is a random or pseudorandom value obtained for each iteration.

3. The method as claimed in claim 1, wherein the grid covers the entire image.

4. The method as claimed in claim 1, wherein M is a random or pseudo random value obtained for each iteration.

5. The method as claimed in claim 1, wherein the pseudo-random values are generated by an algorithm using at least an identifier of the copy as a seed.

6. The method as claimed in claim 1, wherein the random values are associated with an identifier of the copy.

7. A device for marking a copy of a series of images of a same size, wherein the copy is marked with a code that uniquely identifies the copy, the device comprising:
   means for defining a grid of P separate numbered virtual fields so that the grid covers at least part of each image of the series;
   means for obtaining a random or pseudo-random value between 1 and P inclusive; and
   means for (i) marking M consecutive images in the series of images by placing a visible mark in the virtual field with a number corresponding to the random or pseudo-random value, (ii) skipping N consecutive images in the series of images immediately following the M consecutive marked images, and (iii) repeating (i) and (ii) at least once;
   wherein values of M and N vary according to a random, pseudo-random or other sequence.

8. A support comprising a series of images of the same size marked using the method as claimed in claim 1.

9. The support as claimed in claim 8, wherein the support is a film reel.

* * * * *